12) United States Patent
Lee (10) Patent No.: US 7,006,561 B2
(45) Date of Patent: Feb. 28, 2006

(54) APPARATUS AND METHOD FOR DETECTING BAUDRATE IN A UNIVERSAL ASYNCHRONOUS RECEIVER/TRANSMITTER (75) Inventor: Dong Sun Lee, Gyunggi-do (KR)

(73) Assignee: LG Electronics Inc., Seoul (KR)

( * ) Notice: Subject to any disclaimer, the term of this patent is extended or adjusted under 35 U.S.C. 154(b) by 728 days.

(21) Appl. No.: 10/029,262

(22) Filed: Dec. 28, 2001

(65) Prior Publication Data

US 2002/0122476 A1   Sep. 5, 2002

(30) Foreign Application Priority Data

Dec. 29, 2000   (KR) ............................... 2000-84991

(51) Int. Cl.
H04B 17/00   (2006.01)
H04B 3/46    (2006.01)
H04Q 1/20    (2006.01)

(52) U.S. Cl. ...................... 375/225; 375/224; 375/231
(58) Field of Classification Search ............... 375/219, 375/222, 225, 377
See application file for complete search history.

(56) References Cited

U.S. PATENT DOCUMENTS

| 4,896,334 | A | * | 1/1990 | Sayar ......................... 375/293 |
| 5,008,902 | A | * | 4/1991 | Key et al. ................... 375/225 |
| 5,048,060 | A | * | 9/1991 | Arai et al. .................. 375/355 |
| 5,049,875 | A | * | 9/1991 | DeLuca et al. ............. 340/7.58 |
| 5,297,186 | A | * | 3/1994 | Dong ......................... 375/222 |
| 5,627,858 | A | * | 5/1997 | Mak et al. .................. 375/225 |
| 5,923,705 | A | * | 7/1999 | Willkie et al. .............. 375/220 |
| 5,982,837 | A | * | 11/1999 | Earnest ....................... 375/377 |
| 6,072,827 | A | * | 6/2000 | Krulce ........................ 375/225 |
| 6,198,785 | B1 | * | 3/2001 | Flynn .......................... 375/377 |
| 6,847,615 | B1 | * | 1/2005 | Walter et al. ............... 370/252 |

* cited by examiner

Primary Examiner—Stephen Chin
Assistant Examiner—Erin M. File
(74) Attorney, Agent, or Firm—Fleshner & Kim, LLP (57) ABSTRACT Disclosed is a Universal Asynchronous Receiver/Transmitter, more particularly, an apparatus and a method for detecting an optimum baudrate. The method preferably includes calculating a number of samplings for each pulse width based on at least one pulse generated from received data; calculating an estimated baudrate and another number of samplings corresponding to the baudrate based on the number of samplings for each pulse width, respectively; and detecting an optimum baudrate based on the calculated sampling number. Advantageously, the speed of baudrate detection is improved, and data loss is reduced or eliminated.

32 Claims, 6 Drawing Sheets

| 1 X | p←Sampling number |
|---|---|
| 1.5 X | p←Sampling number*2/3 |
| 2 X | p←Sampling number/2 |
| 3 X | p←Sampling number/3 |
| 4 X | p←Sampling number/4 |
| 6 X | p←Sampling number/6 |
| 8 X | p←Sampling number/8 |

APPARATUS AND METHOD FOR DETECTING BAUDRATE IN A UNIVERSAL ASYNCHRONOUS RECEIVER/TRANSMITTER

BACKGROUND OF THE INVENTION

1. Field of the Invention

The present invention relates to a Universal Asynchronous Receiver/Transmitter (UART), and more particularly to an apparatus and a method for detecting baudrate in a UART.

2. Background of the Related Art

Generally, a portable communication device is connected to communicate with an external communication device. A Universal Asynchronous Receiver/Transmitter (UART) converts digital data between two communication devices to facilitate such communication.

Typically, the UART provides various functions. First, the UART can convert bytes input from the portable communication device through a parallel circuit into a serial bits stream to transfer the converted bytes to the external device. Second, the UART can convert the serial bit stream into data bytes of a prescribed size for processing the bit stream in the portable communication device. Third, the UART can add parity bits to transmitted data, confirm the parity of received data, and remove the parity bits of received data. Fourth, the UART can add a start bit and a stop bit to the data to be transmitted to the external device and remove the start bit and the stop bit from the received data. Fifth, the UART can manage the speed of data communications between the portable communication devices to the speed of the exterior communication devices.

The UART described above supports different baudrates. The baudrates include, for example, 75, 150, 300, 600, 1.2K, 2.4K, 3.6K, 4.SK, 7.2K, 9.6K, 14.4K, 19.2K, 28.8K, 38.4K, 57.6K, 115.2K and 230.4K baud. Accordingly, the UART can select an optimum baudrate through a parity checking process (hereinafter referred to as "parity-check") based on the received data.

Figure 1:
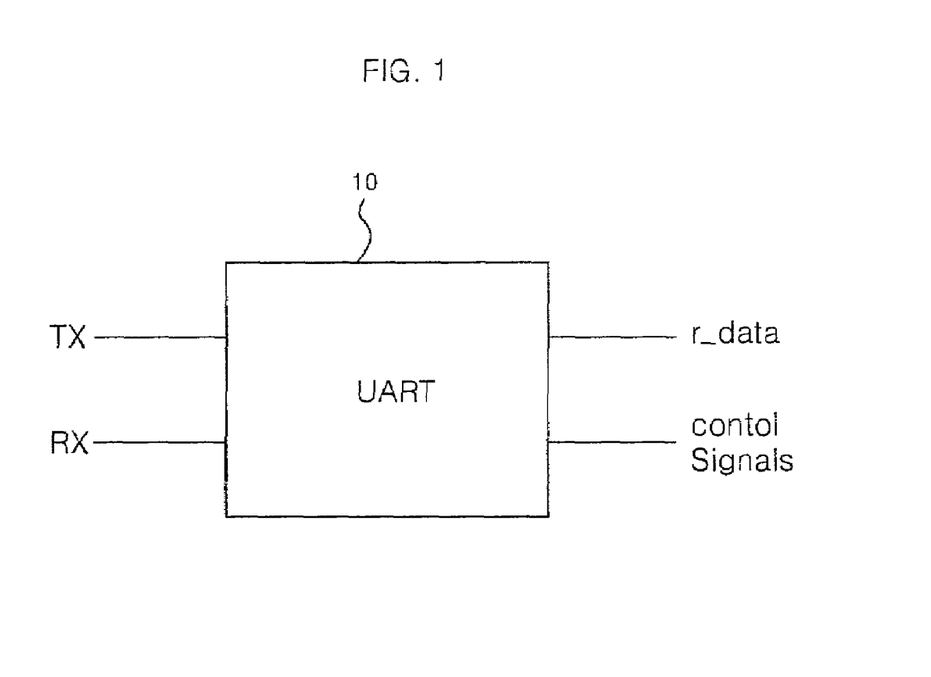
FIG. 1 is a schematic block diagram illustrating a related art universal asynchronous receiver/transmitter.

FIG. 1 is a schematic block diagram illustrating a related universal asynchronous receiver/transmitter. Referring to FIG. 1, a UART 10 can detect an optimum baudrate for received data through a parity check of multiple baudrates after receiving a constant amount of data through a receiving terminal RX. The multiple baudrates include, for instance, 75, 150, 300, 600, 1.2K, 2.4K, 3.6K, 4.8K, 7.2K, 9.6K, 14.4K, 19.2K, 28.8K, 38.4K, 57.6K, 115.2K and 230.4K which can be predetermined in the UART 10. Generally, a previously known baudrate detection process is conducted by a built-in program in the UART 10 wherein an initial baudrate is set at a maximum baudrate of 230.4K baud. When data is input, the UART 10 determines whether an error is generated based on the initial baudrate. If no error exists, the initial baudrate is determined to be the optimum baudrate. If there is an error, however, the baudrate is set to 115.2K baud and the UART 10 again checks for an error. The foregoing process is repeated until an optimum baud rate is determined, or until the lowest baudrate, for instance 75 baud, has resulted in an error.

The system and method of the related art has various problems. For example, it takes a long time to search for the optimum baudrate among various baudrates via parity check. Moreover, a part of the received data is often lost during the operation as described above.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide an apparatus and method for determining an optimum baudrate in a universal asynchronous receiver/transmitter that does not result in the loss of data.

Another object of the present invention is to provide an apparatus and method for quickly determining a baudrate in a universal asynchronous receiver/transmitter.

In order to achieve at least the above objects in whole or in part, there is provided a method for detecting baudrate in a Universal Asynchronous Receiver/Transmitter (UART), including calculating a first number of samplings for each pulse width based on at least one pulse generated from received data, determining an estimated baudrate and a second number of samplings corresponding to the estimated baudrate based on the first number of samplings for each pulse width, respectively, and detecting an optimum baudrate based on the second number of samplings.

To further achieve at least the above objects in whole or in part, there is provided an apparatus for detecting a baudrate in a Universal Asynchronous Receiver/Transmitter, including a device for calculating a number of samplings for each of at least one pulse width based on at least one pulse produced from received data, a device for determining an estimated baudrate and a second number of samplings corresponding to the estimated baudrate, respectively, based on the first number of samplings for each pulse width, and a device for adding together a present and a next sampling number until the second number of samplings corresponding to the estimated baudrate becomes greater than a prescribed number, and outputting word bits depending on the number of pulse widths and whether an error has occurred.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

A preferred embodiment of the present invention will now be described with reference to the accompanying drawings.

Figure 2:
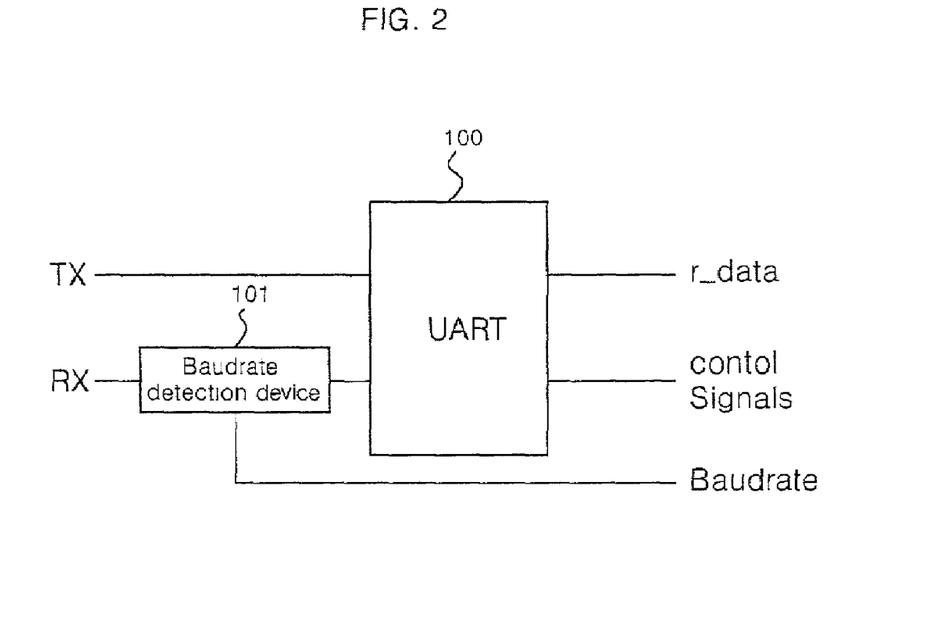
FIG. 2 is a schematic block diagram illustrating a universal asynchronous receiver/transmitter according to a preferred embodiment of the present invention.

FIG. 2 is a schematic block diagram illustrating a Universal Asynchronous Receiver/Transmitter (UART) according to a preferred embodiment of the present invention. The UART preferably includes an Asynchronous Receiver/Transmitter, and further includes a baudrate detection device 101 that can be equipped at a receiving part of the UART 100. As described above, the related art UART detects the optimum baudrate by executing an internal routine. The UART 100 of the preferred embodiment preferably detects the optimum baudrate by employing the hardware type baudrate detection device 101. If the optimum baudrate is not detected from a first input data, the optimum baudrate can be detected from a next input data. Also, since the data used in detecting the optimum baudrate are preferably stored in the baudrate detection device 101, the same data is not repeatedly input to the device 101.

Figure 3:
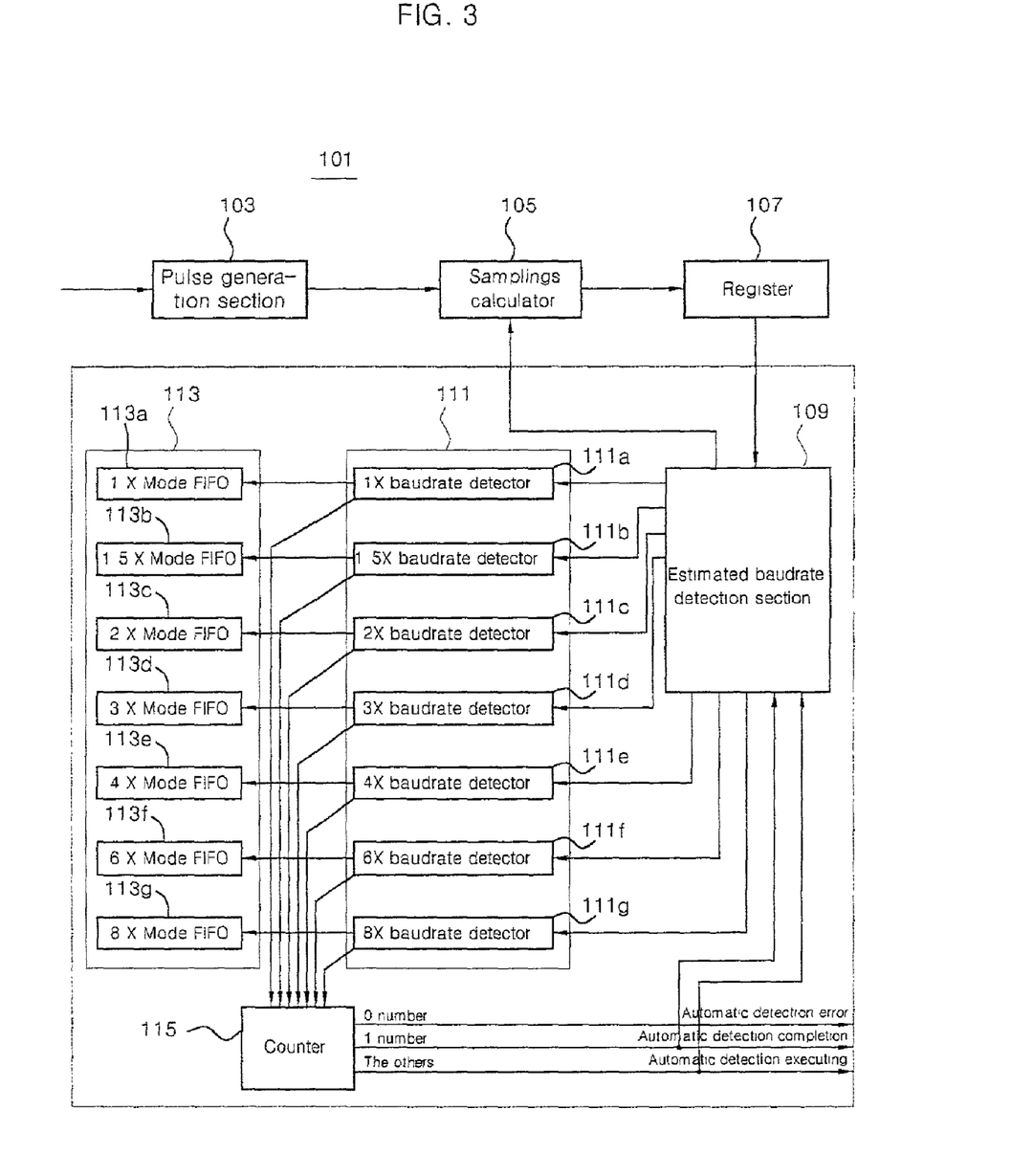
FIG. 3 is a block diagram illustrating a baudrate detection device of a universal asynchronous receiver/transmitter according to a preferred embodiment of the present invention.

FIG. 3 is a block diagram illustrating the baudrate detection device of the UART according to a preferred embodiment of the present invention. As shown therein, the baudrate detection device 101 preferably includes a pulse generation section 103, a sampling calculator 105, and a register 107. It further preferably includes an estimated baudrate detection section 109, an optimum baudrate detection section 111, a buffer section 113, and a counter 115.

The pulse generation section 103 generates pulses based on input data. Specifically, the pulse generation section 103 preferably generates pulses for a transition from '0' bit to '1' bit or from '1' bit to '0' bit based on the binary bit data. The data is preferably input to the pulse generation section 103 with a data format consisting of a start bit, word bits, a parity bit, and a stop bit. The start bit is preferably '0' and the stop bit is preferably '1'. Accordingly, the pulse generation section 103 can generate at least one pulse, even if the word bit and the parity bit are both '0', since the start bit is '0' and the stop bit is '1'.

The sampling calculator 105 preforms a sampling operation for a gap between the pulses among at least one pulse based on the determined baudrate. The initially determined baudrate is preferably the maximum baudrate. The baudrates are, for instance, 75, 150, 300, 600, 1.2K, 2.4K, 3.6K, 4.8K, 7.2K, 9.6K, 14.4K, 19.2K, 28.8K, 38.4K, 57.6K, 115.2K and 230.4K baud as described above. Therefore, the maximum available baudrate may be 230.4K. The baudrates are preferably stored in the estimated baudrate detection section 109, and the maximum baudrate is provided to the sampling calculator 105 immediately after pulses are inputted to the sampling calculator 105. The sampling calculator 105 preferably calculates the number of samplings using the maximum baudrate. If the number of samplings of the first pulse width exceed a prescribed number (for example, 10), the estimated baudrate detection section 109 calculates the number of samplings of the first pulse width again by providing a next baudrate to the sampling calculator 105. The next baudrate may be 115.2K, for example. The operation can be repeatedly carried out until the number of the first pulse width is lower than the prescribed number (for example, 10).

The register 107 sequentially stores multiple sampling numbers calculated in the sampling calculator 105. For example, if the number of pulses outputted from the pulse generation section 103 is 8 (eight), the number of pulse widths may be 7 (seven). If the number of samplings calculated by using the maximum baudrate based on 7 (seven) pulse widths in the sampling calculator 105 is 8, 4, 6, 4, 8, 2 and 6 from the first pulse width, then 4, 6, 4, 8, 2 and 6 can be stored in series from the number of samplings of the first pulse width of 8 (eight). The sampling numbers are subsequently outputted to the estimated baudrate detection section 109.

The estimated baudrate detection section 109 preferably receives the number of samplings of the first pulse width. The estimated baudrate detection station 109 also preferably calculates estimated baudrates and the number of samplings P corresponding to the respective estimated baudrates using a mapping table such as the table shown in FIG. 4. The estimated baudrate detection section 109 provides the number of samplings to the optimum baudrate detection section 111. Since the optimum baudrate detection section 111 includes a plurality of X baudrate detectors 111a to 111g corresponding to the estimated baudrates, the detection section 109 provides the calculated sampling number to each of the X baudrate detectors 111a to 111g. Also, the detection section 109 provides the calculated sampling numbers in the same operation as described above into the X baudrate detectors 111a to 111g by sequentially receiving several sampling numbers following the first pulse width. As mentioned above, the estimated baudrate detection section 109 forwards the maximum baudrate initially determined to the sampling calculator 105 and receives the number of sampling of the first pulse width among the number of samplings calculated for each the pulse width to be correspondent to the maximum baudrate. If the received sampling number exceeds the prescribed number, the next baudrate is set and forwarded to the sampling calculator 105. Such operation can be conducted repeatedly until the number of samplings of the first pulse width becomes smaller than the prescribed number.

The optimum baudrate detection section 111 includes a plurality of X baudrate detectors 111a~111g and receives the number of samplings calculated in the estimated baudrate detection section 109. As mentioned above, the estimated baudrate detection section 109 calculates the estimated baudrate and the number of samplings corresponding to the estimated baudrate based on the number of samplings sequentially input from the register 107. Accordingly, the optimum baudrate detection section 111 sequentially receives sampling numbers from the estimated baudrate detection section 109.

Figure 4:
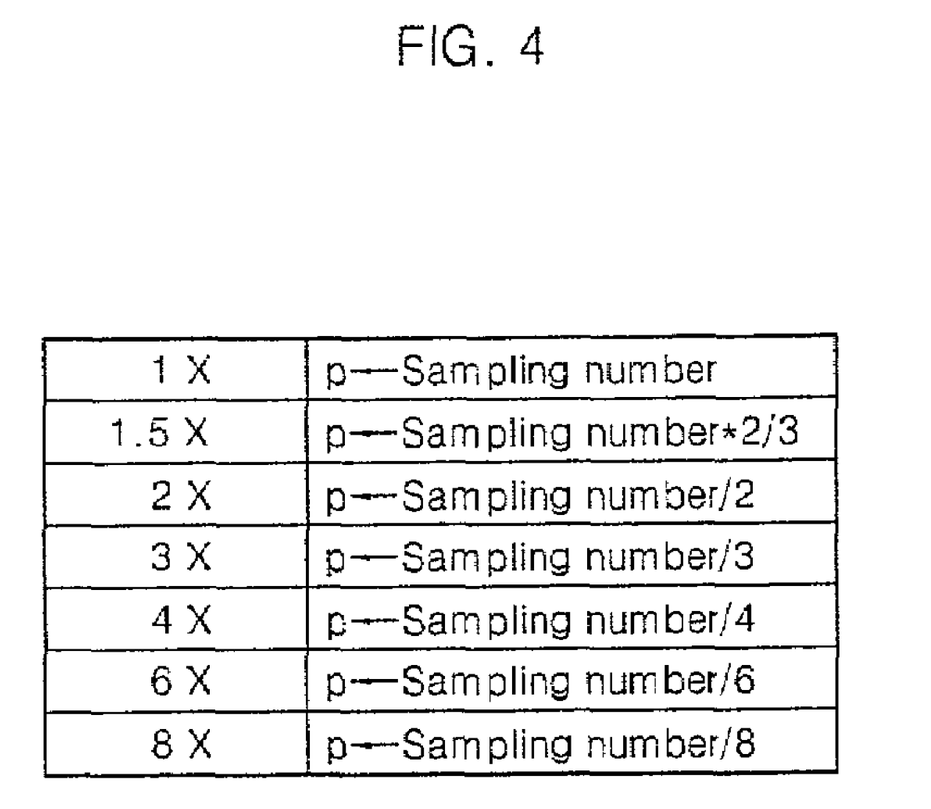
FIG. 4 is a table stored in an estimated baudrate detection section of the universal asynchronous receiver/transmitter according to a preferred embodiment of the present invention.

For example, if the numbers input from the register 107 to the estimated baudrate detection section 109 are 8, 4, 6, 4, 8, 2 and 6, the detection section 109 detects the estimated baudrates 1X, 2X, 4X and 8X with reference to a mapping table such as the table in FIG. 4. Thus, from the first input number, 8, the detection section 109 can calculate sampling numbers 8, 4, 2 and 1 corresponding to the estimated baudrates. 4 is calculated as a sampling number from the estimated baudrate 1X, 2 is calculated from 2X, and 1 is calculated from 1X when the number 4 is inputted. The remaining sampling numbers in the register are also used to obtain the estimated baudrate and the calculated number sampling by referring to the mapping table as shown in Table 1.

TABLE 1

| Register | | Prediction Baudrate Detection Section | |
|---|---|---|---|
| Number | Number of Sampling | Prediction Baudrate | Calculated number of Sampling |
| 1 | 8 | 1X | 8 |
| | | 2X | 4 |
| | | 4X | 2 |
| | | 8X | 1 |
| 2 | 4 | 1X | 4 |
| | | 2X | 2 |
| | | 4X | 1 |
| 3 | 6 | 1X | 6 |
| | | 1.5X | 4 |
| | | 2X | 3 |
| | | 3X | 2 |
| | | 6X | 1 |
| 4 | 4 | 1X | 4 |
| | | 2X | 2 |
| | | 4X | 1 |
| 5 | 8 | 1X | 8 |
| | | 2X | 4 |
| | | 4X | 2 |
| | | 8X | 1 |
| 6 | 2 | 1X | 2 |
| | | 2X | 1 |
| 7 | 6 | 1X | 6 |
| | | 1.5X | 4 |
| | | 2X | 3 |
| | | 3X | 2 |
| | | 6X | 1 |

The number in Table 1 represents an order of storing the number of samplings in the register 107. For example, the number of samplings for the first pulse width is stored in the number 1 register, and the next pulse widths are stored in the number 2 register. The "number of samplings" is a value calculated in the sampling calculator 105. The "prediction baudrate" and the "calculated number of samplings" are produced for each the sampling numbers which are sequentially input from the register 107 by referring the mapping table in the detection section 109.

As shown in Table 1, it should be understood that the prediction baudrates depend on the number of samplings of the register 107. For instance, 8 as the number of samplings of the first pulse width provide four estimated baudrates, while 4 of the second pulse width generates three predicted baudrates.

Therefore, 1X baudrate detector 111a of the optimum baudrate detection section 111 receives the calculated number of samplings 8, 4, 6, 4, 8, 2 and 6 in order, where the 1.5X detector 111b receives the calculated number of samplings 4 and 4. Similarly, the 2X detector 111c receives the calculated number of samplings 4, 3, 4, 3, 4, 1 and 3, while the 3X detector 111d receives 2 and 2. On the basis of the estimated baudrate for the first pulse width, the number of samplings calculated by the detection section 109 is input to the corresponding detector.

Thus, the calculated sampling numbers 8, 4, 2 and 1 can be input to the respective detector such as 1X detector 111a, 2X detector 111c, 4X detector 111e and 8X detector 111g. For the second pulse width, the estimated baudrates produced are 1X, 2X and 4X. However, if both of the prediction baudrates obtained from the number of samplings of the first and the second pulse widths are not equal to each other, the estimated baudrate detection section 109 activates only the X baudrate detector identical to the estimated baudrate calculated from the number of samplings of the second pulse width among the detectors 111a–111g. For example, since 8X is not matched with the estimated baudrates 1X, 2X and 4X obtained from the second pulse width among 1X, 2X, 4X and 8X for the first pulse width, the detection section 109 can preferably stop the operation of the 8X baudrate detector 111g. Consequently, the detector 111g does not detect the optimum baudrate. Similarly, if conducting the same procedures after the second pulse width, the remainder is merely one or two detector(s) among the detectors 111a–111g to detect the optimum baudrate in the optimum baudrate detection section 111.

The optimum baudrate detection section 111 subsequently receives the number of samplings corresponding to the estimated baudrates calculated on the basis of sampling numbers for the respective pulse widths as described above, accumulates each of the numbers therefrom, and determines whether the buffer 113 is clear along the first width or the number of pulse widths and through the error checking process, when the number exceeds a prescribed condition. In this regard, the error check represents the parity check to be operated on the basis of the parity bits included in one of the data. It should be noticeable that the optimum baudrate detection section 111 has to receive the word bits and parity bits with the number of samplings from the estimated baudrate detection section 109.

Thus, the detection section 111 preferably determines whether the first pulse width is received, whether the number of pulse widths is odd, and/or whether an error is occurs. If it turns out to be the first pulse width, or the number of pulse widths is an odd number with no error, then the optimum baudrate detection section 111 can preferably store the word bits to the buffer section 113. In other words, the word bits can be output from any one of the X baudrate detectors 111a–111g and stored in the corresponding X mode FIFO 113a–113g of the buffer section 113. If turns out to not the first pulse width, or the number of pulse widths is an even number with an error, then the optimum baudrate detection section 111 sends a control signal to the buffer section 113 to remove the word bits previously stored.

Whenever the word bits from the plurality of X baudrate detectors 111a–111g are stored along the X mode FIFO 113a–113g to be correspondent, a counter 115 receives active signals from the detectors 111a–111g. The counter 115 outputs any counted number based on the active signals. The counter 115 confirms whether the active signals were received from the X baudrate detectors 111a–111g, and counts and outputs the active signals whenever they are received. For instance, if the output from the counter 115 is zero, an error has occurred in the optimum baudrate detection section 111. If one output is produced, it means that the optimum baudrate is detected in the detection section 111. If at least two outputs are produced from the counter 115 it means that the optimum baudrate is not yet detected.

Consequently, if the output number from the counter 115 is '0', the signal is input into the estimated baudrate detection section 109, then, the number of samplings is calculated based on the optimum baudrate with reference to the data inputting into the sampling counter 105. If the output number from the counter 115 is '1', the signal is input into the estimated baudrate detection section 109, and the detection of optimum baudrate can stop. Also, if the numbers exists in at least two output signals, a signal is input to the detection section 109 and stored into the register 107. Then, the detection section 10 again the calculates estimated baudrate based on the number of samplings of the first pulse width.

Figure 5:
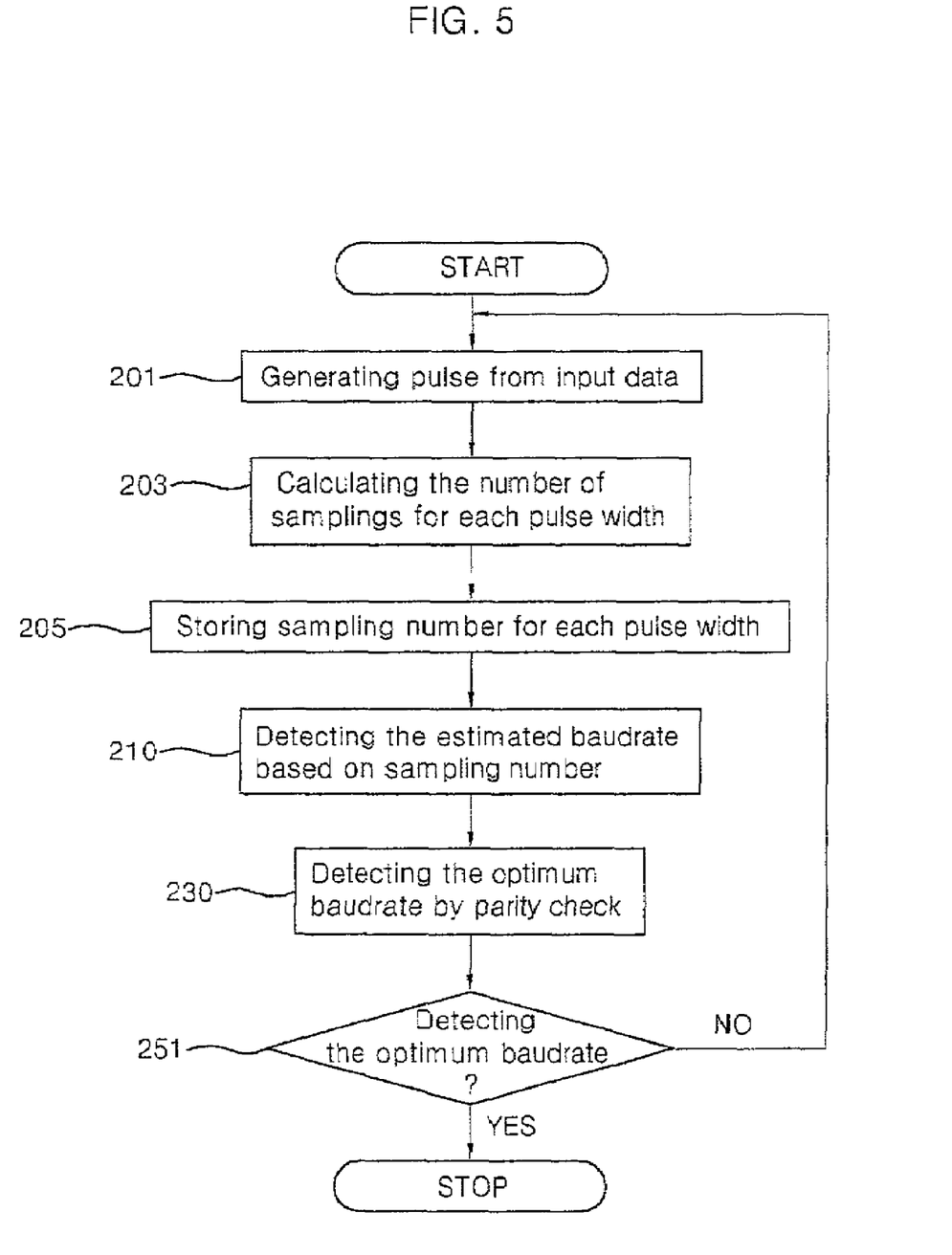
FIG. 5 is a flow chart illustrating a process for detecting baudrate in a baudrate detection device of a universal asynchronous receiver/transmitter according to a preferred embodiment of the present invention.

FIG. 5 is a flow chart illustrating the process of detecting baudrate in the baudrate detection device of the UART according to a preferred embodiment of the present invention. Referring to FIG. 5, the pulses are produced on the basis of input data from the pulse generation section (Step 201). As described above, the data preferably comprises the start bit, the word bit, the parity bit, and the stop bit. The pulse generation section preferably generates pulses whenever the bit value is varied based on at least one bits input in series. Thus, if the input bits are '00' or '11', the pulse generation section does not generate the pulses. If the input bit is '01' or '10', it preferably will produce the pulses.

The pulses output from the pulse generation section are preferably input into the sampling calculator 105 to calculate the number of samplings for each pulse width and to send the number of samplings to a register (Step 203). The calculator 105 designates the gap between the input pulse and the next pulse as the first pulse width, and another gap between the next and a subsequent pulse as the next pulse width. The calculator can produce the number of samplings of the pulse width on the basis of a maximum baudrate determined from the estimated baudrate detection section 109 for each of the pulse widths selected as described above. As known in the related art, the baudrate is in inverse proportion to the number of samplings. Thus the number of samplings calculated for one of the pulse widths decreases if the baudrate increases.

The number of samplings for each pulse width output from the calculator 105 is preferably stored in order of input into the register 107 (Step 205). The register 107 can move and store the number of samplings for each pulse width in order of input from the calculator similar to the FIFO manner. Of course, the register 107 can input the prior sampling of the pulse width into the estimated baudrate detection section 109 before storing a next pulse width. As soon as the number of samplings is input to the register 107, it can be input to the detection section 109.

The estimated baudrate detection section 109 receives the number of samplings of the first pulse width and detects the estimated baudrate based on the sampling number (Step 210). Step 210 will be described in more detail with reference to FIG. 6.

Figure 6:
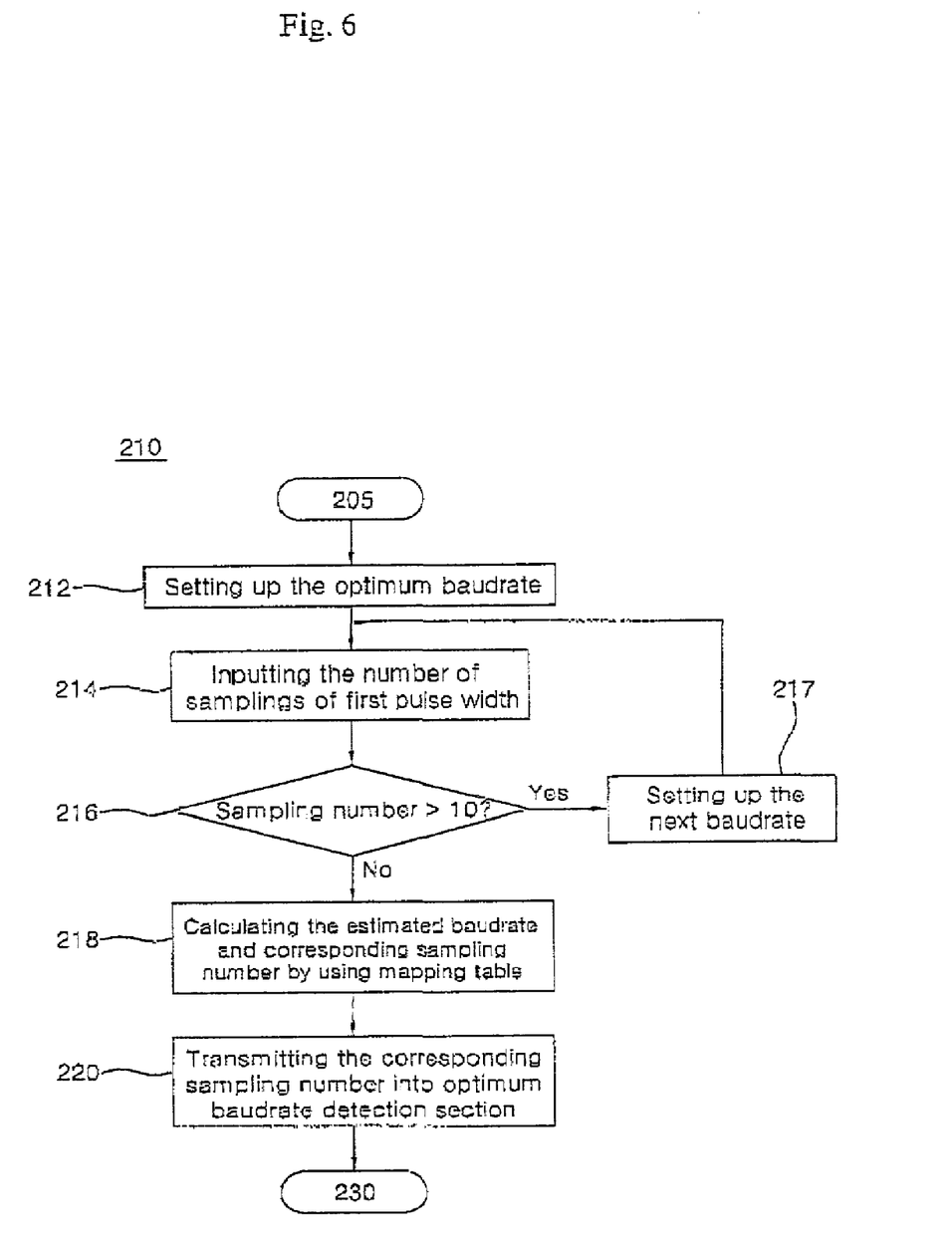
FIG. 6 is a flow chart illustrating a process for detecting an estimated baudrate in the baudrate detection process of FIG. 5.

FIG. 6 is a flow chart illustrating the process of detecting the estimated baudrate by the detection device of FIG. 5. Referring to FIG. 6, as described above, the detection section 109 preferably determines the optimum baudrate among the already stored baudrates when the pulse is inputted to the samplings calculator 105 (Step 212), and sends information on the determined maximum baudrate to the sampling calculator 105 Then, on the basis of the maximum baudrate, the number of samplings for each pulse width can be calculated by the sampling calculator 105.

The estimated baudrate detection section 109 receives the number of samplings of the first pulse width among the numbers for each pulse width calculated by the calculator 105 and stored in the register 107 (Step 214). The detection section 109 determines whether the number of samplings of the first pulse width exceeds 10 (Step 216). If the number of samplings of the first pulse width exceeds 10, then the detection section 109 determines the next baudrate and sends it to the calculator 105 (Step 217). Then the calculator 105 again calculates the number of samplings for each pulse width on the basis of the next baudrate, the detection section 109 again receives the number of samplings of the first pulse width among the number of samplings for each pulse width (step 214) and confirms whether the sampling number exceeds 10 (step 216). Such operation is repeatedly conducted to reach 10 or less of the number of samplings of the first pulse width.

If the number is 10 or less, the estimated baudrate detection section 109 preferably calculates the estimated baudrate and the sampling number corresponding to the baudrate by using the mapping table previously stored (Step 218). As illustrated in Table 1, for instance, when the number of samplings in the first pulse width is 8, the estimated baudrates by the detection section 109 are calculated such as 1X, 2X, 4X and 8X, respectively, thereby producing the corresponding sampling numbers of 8, 4, 2 and 1, respectively. Therefore, eight (8) sampling numbers corresponding to 1X are inputted into 1X baudrate detector, four (4) sampling numbers corresponding to 2X are input into 2X baudrate detector, two (2) numbers corresponding to 4X are input to 4X baudrate detector and one (1) number corresponding to 8X is input to 8X baudrate detector, respectively. As described above, such 1X, 2X, 4X and 8X detectors can serve to detect the optimum baudrate.

At least one sampling number calculated by applying to the mapping table is input to the X type detectors (Step 220).

Thus, where the number of samplings of the first pulse width is equal to 10 or less, the estimated baudrate and the number of samplings corresponding to the estimated baudrate is calculated. Then the detection section 109 receives the number of samplings after the first pulse width in series, calculates their estimated baudrates and the sampling numbers corresponding the baudrates, and sends them to the respective X detector.

Again referring to FIG. 5, the optimum baudrate detection section 111 including the X baudrate detectors receive the number of samplings calculated by the estimated baudrate detection section, the word bits, and the parity bits. The optimum baudrate detection section 111 can detect the optimum baudrate by conducting an error check on the basis of the parity bit (Step 230). The step 230 will be described in more detail with reference to FIG. 7.

Figure 7:
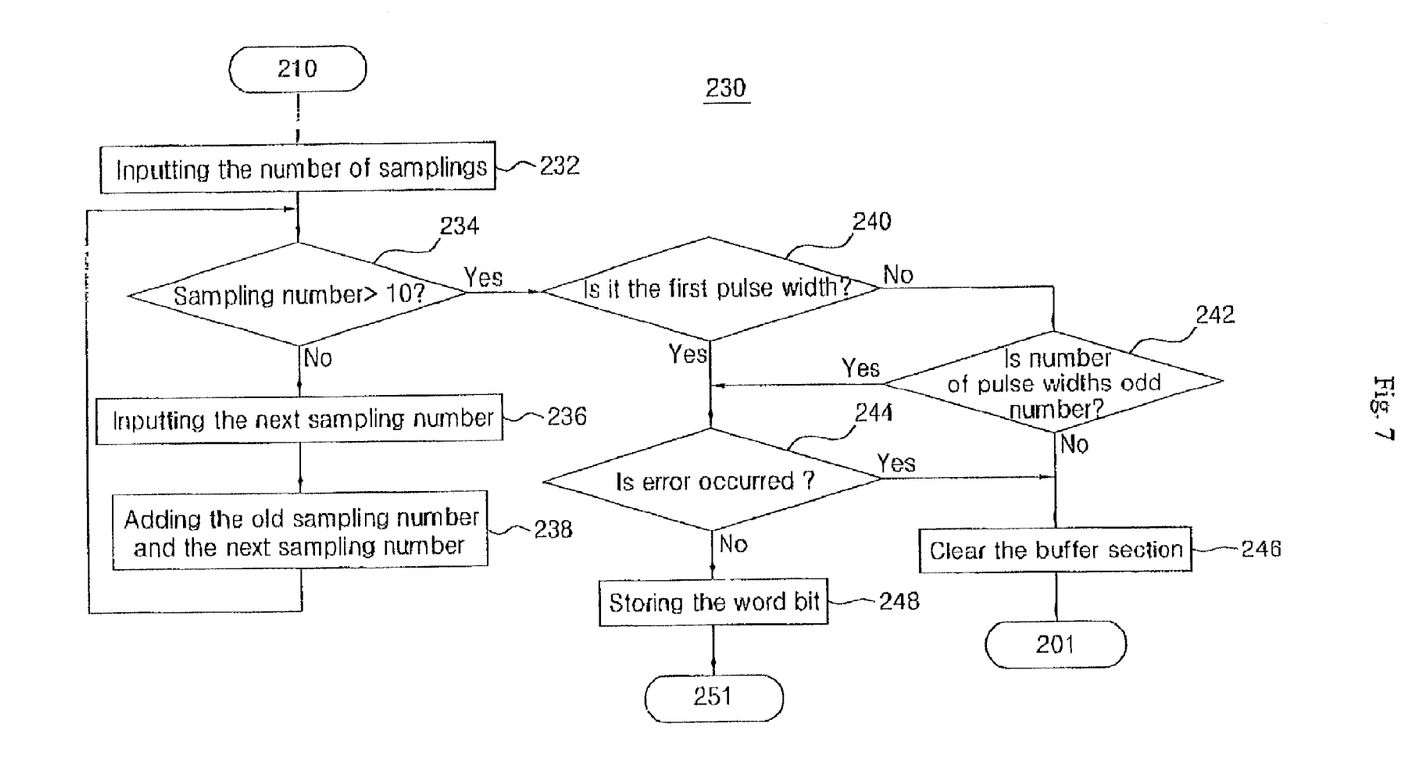
FIG. 7 is a flow chart illustrating the process of detecting an optimum baudrate among a plurality of estimated baudrates in the baudrate detection device of FIG. 5.

FIG. 7 is a flow chart illustrating the process of detecting an optimum baudrate among a plurality of estimated baudrates in the baudrate detection method of FIG. 5. Referring to FIG. 7, the optimum baudrate detection section 111 receives the number of samplings (Step 232) and determines whether the number exceeds 10 (Step 234). In this regard, the sampling number represents the number of samplings of the first pulse width, and the optimum baudrate may correspond with one of the several X baudrate detectors.

If the number does not exceed 10, the optimum baudrate detection section 111 preferably receives the next sampling number (Step 236), and produces a summed number by adding the present and the next sampling numbers (Step 238). Then, the detection section 111 confirms again whether the summed number exceeds 10, and repeatedly executes the steps 236 and 238 if the number of samplings does not exceed 10.

If the number of samplings exceeds 10 at Step 234, the optimum baudrate detection section 111 determines whether the number of samplings is the first pulse width (Step 240). If the number is the sum of multiple pulse widths, and not just the first pulse width, the optimum baudrate detection section determines whether the number of the plural pulse widths is an odd number (Step 242). In this case, the number of samplings can be the sum of the number of samplings of the first pulse width or the number of samplings of the multiple pulse widths which is input following the number of the first pulse width. Whether the number of samplings of the pulse widths is an odd number can be determined by counting the number of the multiple pulse widths.

If the number of samplings is the number of samplings of the first pulse width or the number of the multiple pulse widths is an odd number in Step 240 and Step 242, the optimum baudrate detection section 111 determines the existence of an error based on the parity bit (Step 244).

As a result of the above determinations, when the parity bit has no error, the optimum baudrate detection section 111 can store the word bits in the buffer section 113. In this regard, the word bits can preferably be stored in a X mode FIFO within the buffer section 113 in correspondence with the X baudrate detection sections included in the optimum baudrate detection section 111. For example, if the detection of the optimum baudrate is conducted in the 4X baudrate detector, the output word bits from the 4X baudrate detector may be stored in the 4X mode FIFO 113e of the buffer section 113.

If the number of the multiple pulse widths is an even number or the parity bit has an error in Step 242 and Step 244, the optimum baudrate detection section 111 preferably removes the word bits already stored in the buffer section by using a control signal (Step 246).

As described above, the optimum baudrate detection section 111, that is, each of the multiple X baudrate detectors can store the word bits into the buffer section 113 if an error has not occurred. The detection section where an error has occurred can maintain an active signal, whereas a detection section having an error does not maintains an active signal. The steps 232 to step 248 are repeatedly executed until the optimum baudrate is detected.

Again referring to FIG. 5, the counter 115 preferably calculates the number on the basis of input active signals from the X baudrate detectors, and determines whether the optimum baudrate was detected on the basis of the calculated number (Step 251). In other words, if the number of active signals input from the plural X baudrate detection section is '0', the counter 115 sends a signal corresponding to '0' to the estimated baudrate detection section 109, and the step 201 for calculating the number of samplings for each pulse width with reference to the next data can be executed by the estimated baudrate detection section 109. Here, the active signal number of '0' means that there is no multiple X baudrate detector normally operated.

If the active signal number is '1', the counter 115 can stop the optimum baudrate detection process by sending another corresponding signal to '1' to the estimated baudrate detection section 109. Also, if the active signal number is '2' or more, the counter 115 can generate the signal and send it to the estimated baudrate detection section 109, thereby performing the optimum baudrate detection process based on the next data.

When the optimum baudrate is detected in Step 251, that is, the active signal number is '1' in the counter 115, the detection process for the optimum baudrate is complete and/or the detected optimum baudrate can be sent to the main controller (not shown).

The apparatus and method of the preferred embodiment has various advantages. For example, as described above, it is possible to conduct the storage of data simultaneously with the detection of optimum baudrate by applying only one of received data, thereby reducing the time required for detecting the optimum baudrate, and preventing the loss of data. By the apparatus and the method according to the preferred embodiment, it will be appreciated that the detection of optimum baudrate can be embodied in hardware instead of software, thereby accomplishing a more improved and speedy detection process.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for detecting a baudrate in a Universal Asynchronous Receiver/Transmitter (UART), comprising:
   calculating a first number of samplings for each pulse width based on at least one pulse generated from received data;
   determining an estimated baudrate and a second number of samplings corresponding to the estimated baudrate based on the first number of samplings for each pulse width, respectively; and
   detecting an optimum baudrate based on the second number of samplings;
   wherein the at least one pulse generated from the received data corresponds to a transition from a '0' bit to a '1' bit or from a '1' bit to a '0' bit in the receive data, and
   wherein each pulse width corresponds to a gap between the at least one pulse and a next generation pulse.

2. The method of claim 1, wherein calculating a first number of samplings for each pulse width is conducted by using at least one prescribed baudrate.

3. A method for detecting a baudrate in a Universal Asynchronous Receiver/Transmitter (UART), comprising:
   calculating a first number of samplings for each pulse width based on at least one pulse generated from received data;
   determining an estimated baudrate and a second number of samplings corresponding to the estimated baudrate based on the first number of samplings for each pulse width, respectively; and
   detecting an optimum baudrate based on the second number of samplings,
   wherein the estimated baudrate and the second number of samplings corresponding to the estimate baudrate are determined when the first number of samplings of a first input pulse width among a plurality of pulse widths is less than or equal to a prescribed value.

4. The method of claim 3, wherein the prescribed value is 10.

5. The method of claim 3, wherein the second number of samplings is adjusted by a prescribed baudrate in a descending order from a maximum baudrate until the second number of samplings becomes less than or equal to the prescribed value, if the first number of samplings of the first input pulse width is greater than the prescribed value.

6. The method of claim 5, wherein the prescribed value is 10.

7. The method of claim 1, wherein calculating the estimated baudrate is executed by employing a mapping table.

8. The method of claim 1, wherein at least two estimated baudrates are calculated.

9. A method for detecting baudrate in a Universal Asynchronous Receiver/Transmitter (UART), comprising:
calculating a first number of samplings for each pulse width based on at least one pulse generated from received data;
determining an estimated baudrate and a second number of samplings corresponding to the estimated baudrate based on the first number of samplings for each pulse width, respectively; and
detecting an optimum baudrate based on the second number of samplings,
wherein detecting the optimum baudrate comprises:
providing the second number of samplings calculated based on the first number of samplings of a first pulse width by a baudrate detector corresponding to the estimated baudrate;
adding a present and a next sampling number in the baudrate detector until the number provided becomes greater than a prescribed number; and storing word bits or removing word bits previously stored depending on the number of pulse widths and whether an error has occurred, if the sampling number exceeds the prescribed number.

10. The method of claim 9, wherein the prescribed number is 10.

11. The method of claim 9, further comprising generating an active signal in storing the word bits and determining whether the optimum baudrate was detected by calculating the number of a active signal.

12. An apparatus for detecting a baudrate in a Universal Asynchronous Receiver/Transmitter, comprising:
means for calculating a number of samplings for each of at least one pulse width based on at least one pulse produced from received data;
means for determining an estimated baudrate and a second number of samplings corresponding to the estimated baudrate, respectively, based on the first number of samplings for each pulse width; and
means for adding together a present and a next sampling number until the second number of samplings corresponding to the estimated baudrate becomes greater than a prescribed number, and outputting word bits depending on the number of pulse widths and whether an error has occurred.

13. The apparatus of claim 12, wherein the prescribed number is 10.

14. The apparatus of claim 12, wherein the means for adding and outputting comprises a 1X baudrate detector, a 1.5X baudrate detector, a 2X baudrate detector, a 3X baudrate detector, a 4X baudrate detector, a 6X baudrate detector, and a 8X baudrate detector.

15. The apparatus of claim 14, wherein the 1X, 1.5X, 2X, 3X, 4X, 6X, and 8X baudrate detectors generate active signals when the respective word bit is output, respectively.

16. The apparatus of claim 15, further comprising:
means for storing the word bits; and
means for determining whether an optimum baudrate was detected by the number of active signals generated from 1X, 1.5X, 2X, 3X, 4X, 6X, and 8X baudrate detectors.

17. The apparatus of claim 12, further comprising means for inputting/outputting the respective pulse width calculated by the means for determining according to a first in first out (FIFO) sequence.

18. The apparatus of claim 13, wherein the means for calculating adjusts the number of samplings of pulse width in accordance with a prescribed baudrate.

19. The apparatus of claim 13, wherein the means for determining the estimated baudrate calculates the estimated baudrate and the second number of samplings corresponding to the estimated baudrate by utilizing a mapping table.

20. The apparatus of claim 13, wherein the means for determining the estimated baudrate calculates the estimated baudrate when the number of samplings of the first input pulse width among the number of samplings of a plurality of pulse widths becomes less than or equal to the prescribed number.

21. The apparatus of claim 13, wherein the available baudrate means activates only the X baudrate detector corresponding to a second estimated baudrate when a first estimated baudrate is not equal to the second estimated baudrate, and wherein the first estimated baudrate is the baudrate calculated from a previous pulse width and the second estimated baudrate is the baudrate calculated from a next pulse width.

22. A baudrate detection device, comprising:
a pulse generator, configured to receive an input signal and generate at least one pulse;
a sampling calculator, coupled to receive an output of the pulse generator and configured to generate a first number of samplings for each pulse width between the least one pulse in accordance with an estimated baudrate;
an estimated baudrate detector, coupled to receive the first number of samplings and determine the estimated baudrate and a second number of samplings corresponding to the estimated baudrate based on the first number of samplings for each pulse width, respectively; and
an optimum baudrate detector unit, configured to detect an optimal baudrate based on the second number of samplings,
wherein the at least one pulse generated from the received data corresponds to a transition from a '0' bit to a '1' bit or from a '1' bit to a '0' bit in the received data, and
wherein each pulse width corresponds to a gap between the at least one pulse and a next generation pulse.

23. The device of claim 22, further comprising a register coupled to receive an output of the sampling calculator, configured to store the first sampling number and provide the first sampling number to the estimated baudrate detector.

24. The device of claim 22, wherein the estimated baudrate detector comprises a table to map the first sampling number to the estimated baudrate and the second sampling number.

25. The device of claim 22, further comprising a buffer configured to store an output of the optimum baudrate detector unit.

26. The device of claim 22, further comprising a counter configured to count an output of the optimum baudrate detector unit.

27. The device of claim 22, wherein the optimum baudrate detector unit comprises a plurality of optimum baudrate detectors, each configured to detect a prescribed baudrate.

28. A baudrate detection device, comprising;
a pulse generator, for receiving an input signal and generating at least one pulse based on a transition of the input signal;
a sampling calculator for calculating a number of samplings for each pulse width according to a reference baudrate;
a first baudrate detector for determining at lease one estimated baudrate based on the number of samplings of a first pulse width of the input signal and for calculating a number of samplings for each pulse width corresponding to the at lease one estimated baudrate using a predetermined mapping table; and a plurality of second baudrate detectors coupled to the first baudrate detector for detecting whether the input signal corresponds to at least one estimated baudrate based on the number of sampling for each pulse width and a parity error check;

wherein the at least one pulse generated from the received data corresponds to a transition from a '0' but to a '1' bit or from a '1' bit to a '0' bit in the receive data, and wherein each pulse width corresponds to a gap between the at least pulse and a next generation pulse.

29. The baudrate detection device of claim 28, wherein the reference baudrate is adjusted or not based on the first number of samplings for the first pulse width.

30. A method for detecting a baudrate in an universal asynchronous receiver/transmitter (UART), comprising:

receiving an input signal and generating at least one pulse based on a transition;

calculating a number of samplings for each pulse width using a reference baudrate;

determining at least one estimated baudrate based on the number of samplings of a first ppulse width of the input signal and calculating a number of samplings for each pulse width corresponding to the at least one estimated baudrate using a predetermined mapping table; and detecting whether the input signal corresponds to at least one estimated baudrate based on the number of samplings for each pulse width and a parity check;

wherein the at least one pulse generated from the received data corresponds to a transition from a '0' but to a '1' bit or from a '1' bit to a '0' bit in the receive data, and wherein each pulse width corresponds to a pap between the at least pulse and a next generation pulse.

31. The method of claim 30, further comprising:

adding the present and the next sample numbers until the number of samplings corresponding to the at least one estimated baudrate becomes higher than a predetermined value.

32. The method of claim 31, further comprising:

determining whether the reference baudrate is adjusted or not based on the first number of samplings for the first pulse width.

* * * * *